(12) United States Patent
Tomita et al.

(10) Patent No.: US 10,754,342 B2
(45) Date of Patent: Aug. 25, 2020

(54) WORK VEHICLE SUPPORT SYSTEM

(71) Applicant: Kubota Corporation, Osaka-shi (JP)

(72) Inventors: Sakura Tomita, Amagasaki (JP); Yuki Kubota, Amagasaki (JP); Chiaki Komaru, Amagasaki (JP); Kazuo Sakaguchi, Amagasaki (JP); Shigeki Hayashi, Sakai (JP); Tetsuya Nakajima, Sakai (JP); Tomohiko Sano, Amagasaki (JP)

(73) Assignee: Kubota Corporation, Osaka (JP)

( * ) Notice: Subject to any disclaimer, the term of this patent is extended or adjusted under 35 U.S.C. 154(b) by 104 days.

(21) Appl. No.: 15/580,006

(22) PCT Filed: Jun. 16, 2016

(86) PCT No.: PCT/JP2016/067922
§ 371 (c)(1),
(2) Date: Dec. 6, 2017

(87) PCT Pub. No.: WO2017/047181
PCT Pub. Date: Mar. 23, 2017

(65) Prior Publication Data
US 2018/0136664 A1    May 17, 2018

(30) Foreign Application Priority Data
Sep. 14, 2015   (JP) ................. 2015-180940

(51) Int. Cl.
*G05D 1/02*   (2020.01)
*A01B 69/04*   (2006.01)
(Continued)

(52) U.S. Cl.
CPC ......... *G05D 1/0219* (2013.01); *A01B 69/008* (2013.01); *A01B 79/005* (2013.01);
(Continued)

(58) Field of Classification Search
CPC .... G05D 1/0219; G05D 1/0259; G05D 1/027; G05D 1/0274; G05D 1/0278;
(Continued)

(56) References Cited

U.S. PATENT DOCUMENTS 4,600,999 A * 7/1986 Ito ................. A01B 69/008
                                            318/587
4,628,454 A   12/1986 Ito
(Continued)

FOREIGN PATENT DOCUMENTS

| JP | 5911409 A | 1/1984 |
| JP | 9178481 A | 7/1997 |

(Continued)

OTHER PUBLICATIONS

Chong et al., "Beidou With us Walk the World", China Astronautics Publishing House, 2011, pp. 112-118.
Titterton et al., "Strapdown Intertial Navigation Technology—2nd Edition", The Institution of Electrical Engineers, 2004, pp. 1-581.

*Primary Examiner* — Anthony R Jimenez
(74) *Attorney, Agent, or Firm* — The Webb Law Firm

(57) ABSTRACT

A work vehicle support system includes: an own vehicle position detecting module configured to detect an own vehicle position of a work vehicle; and a work-unfinished region outer-shape map calculating section configured to calculate, during circulating work-traveling along an outer perimeter of a work scheduled region, an outer-shape map of a work-unfinished region in the work scheduled region, from own vehicle position data acquired by the own vehicle position detecting module.

10 Claims, 7 Drawing Sheets

(51) Int. Cl.
*A01B 79/00* (2006.01)
*A01D 41/127* (2006.01)

(52) U.S. Cl.
CPC ......... *A01D 41/1278* (2013.01); *G05D 1/027* (2013.01); *G05D 1/0259* (2013.01); *G05D 1/0274* (2013.01); *G05D 1/0278* (2013.01); *G05D 2201/0201* (2013.01)

(58) Field of Classification Search
CPC .......... G05D 1/0221; G05D 2201/0201; A01B 69/008; A01B 79/005; A01D 41/1278; A01D 75/30; Y02P 90/26; Y02P 90/28; Y02P 90/86; G06Q 10/067; G06Q 10/06312; G06Q 10/06; G05B 15/02; G05B 19/41885; G05B 19/4189; G06F 19/00; G06F 7/70
USPC .......................................................... 701/25
See application file for complete search history.

(56) References Cited

U.S. PATENT DOCUMENTS

| | | |
|---|---|---|
| 6,128,574 A | 10/2000 | Diekhans |
| 2005/0273253 A1 | 12/2005 | Diekhans et al. |
| 2005/0284119 A1 | 12/2005 | Brunnert |
| 2007/0179704 A1 | 8/2007 | Brunnert |
| 2008/0195270 A1 | 8/2008 | Diekhans et al. |

FOREIGN PATENT DOCUMENTS

| | | |
|---|---|---|
| JP | 1066406 A | 3/1998 |
| JP | 20048186 A | 1/2004 |
| JP | 2004354117 A | 12/2004 |
| JP | 200867617 A | 3/2008 |
| JP | 2015112071 A | 6/2015 |
| WO | 2015133585 A1 | 9/2015 |

* cited by examiner

WORK VEHICLE SUPPORT SYSTEM

TECHNICAL FIELD

The present invention relates to a work vehicle support system for a work vehicle that automatically performs work-traveling in a work field.

BACKGROUND ART

Attempts to realize automatic travel of work vehicles that perform work-traveling have been conventionally made. In order to realize automatic travel of work vehicles, a work region in which work is to be performed has to be recognized through map data or the like. For example, in an unmanned working method for a cultivated land work vehicle disclosed in Patent Literature 1, first, outer perimeter teaching is performed in which the vehicle does one lap through manual driving along the outer perimeter of a piece of cultivated land that is a work region. Accordingly, map coordinates and reference travel cardinal-directions of the cultivated land are calculated. Next, a travel work route along which work-traveling is to be performed over the entire piece of cultivated land is set. Then, the cultivated land work vehicle automatically performs work-traveling along the travel work route based on positional information and travel cardinal-direction information of the vehicle in the cultivated land, which are obtained from moment to moment. Accordingly, work-traveling over the entire piece of cultivated land is automatically performed. The cultivated land work vehicle described in Patent Literature 1 is a tractor that performs tilling work, grading work, soil-puddling work and the like. The tractor performs work-traveling over the entire piece of cultivated land.

Patent Literature 2 discloses a method for calculating a target travel route of an automatic travel rice planting machine. The rice planting machine performs seedling planting work by repeating linear work-traveling. Furthermore, this rice planting machine includes a GPS for measuring the machine body position. Then, the position of a GPS antenna when a teaching switch is pressed at the start of teaching is taken as a start point, and the position of the GPS antenna when the teaching switch is pressed at the end of teaching is taken as an end point. A reference line connecting the start point and the end point is calculated based on information regarding the obtained start point and end point. Then, a straight line that is parallel to the reference line (line segment) and based on a planting width is generated as a target route for planting work-traveling.

PRIOR ART DOCUMENTS

Patent Literatures

Patent Literature 1: JP H10-066406 A
Patent Literature 2: JP 2008-67617 A

SUMMARY OF THE INVENTION

Problem to be Solved by the Invention

According to Patent Literature 1, outer perimeter teaching travel of a work vehicle for calculating an automatic work-traveling route is performed in order to obtain positional information regarding a boundary of a piece of cultivated land. During the outer perimeter teaching travel, no substantial work is performed in the cultivated land. After the outer perimeter teaching travel, a travel work route for the entire region in the boundary of the piece of cultivated land obtained in the outer perimeter teaching travel is calculated. Then, actual automatic work-traveling is performed. Accordingly, in accordance with an increase in the size of a piece of cultivated land in which work is to be performed, the time and fuel necessary for the outer perimeter teaching travel become so large that the wasted cost increases to a non-negligible level in terms of working on cultivated land.

According to Patent Literature 2, it is not clearly described whether or not work (seedling planting work) is performed during linear teaching travel. Furthermore, in calculation of a work-traveling route, routes that can be calculated are limited to work-traveling routes parallel to a linear reference line obtained in linear teaching travel. Moreover, since map information regarding the entire piece of cultivated land cannot be obtained in teaching travel, the number of reciprocating routes and the route length of the work-traveling route cannot be calculated in advance.

In view of these circumstances of conventional techniques, there is demand for a more effective technique for calculating an automatic work-traveling route in a work field whose outer-shape map has not been prepared.

Solution to the Problem

According to the present invention:

A work vehicle support system comprising:

an own vehicle position detecting module configured to detect an own vehicle position of a work vehicle; and a work-unfinished region outer-shape map calculating section configured to calculate, during circulating work-traveling along an outer perimeter of a work scheduled region, an outer-shape map of a work-unfinished region in the work scheduled region, from own vehicle position data acquired by the own vehicle position detecting module.

With this configuration, when circulating along an outer perimeter of a work scheduled region in order to calculate an outer-shape map (coordinate positions) of the work scheduled region, work in the work scheduled region is simultaneously performed. That is to say, through initial work-traveling (also functioning as teaching travel) along the boundary of the work scheduled region, work in the outermost perimeter region in the work scheduled region can be performed, and, at the same time, coordinate positions of the boundary of the work scheduled region can be obtained from own vehicle position data acquired by the own vehicle position detecting module during the initial work-traveling. Then, an outer-shape map of the work-unfinished region excluding the region where work has been finished through the initial work-traveling from the work scheduled region is calculated based on the coordinate positions of the boundary of the work scheduled region. Since work in the work scheduled region is performed also in teaching travel for acquiring coordinate positions of the outermost perimeter region in the work scheduled region, good operation efficiency can be obtained.

Typically, a combine for harvesting grains first performs reaping while circulating along an outer perimeter of a piece of cultivated land, and harvest work is performed in the inner region using, as a direction-change region, the already reaped region along the outer perimeter generated through that reaping. If the reaping while circulating is used as the above-mentioned initial work-traveling (also functioning as teaching travel), good operation efficiency can be obtained. Accordingly, in a preferred embodiment of the present invention, the work vehicle is a combine, and the circulating work-traveling along the outer perimeter is circular reaping travel for harvesting grain culms.

When generating a direction-change region in the initial work-traveling, a direction-change region having a sufficient size may not be obtained by merely performing circulating work-traveling once. In that case, the circulating work-traveling is performed a plurality of times. The inner boundary of the work-finished region generated by the circulating work-traveling can be calculated from an own vehicle position group close to the gravity center position of the circulating trajectory and a work width, from the own vehicle position data acquired in the circulating work-traveling performed a plurality of times. An outer-shape map (outer shape coordinate data) of the work-unfinished region can be calculated based on the coordinate positions along the inner boundary. The work vehicle substantially performs linear travel excluding when it turns at a corner region. If it is assumed, using this aspect, that the trajectory of the circulating work-traveling is constituted by lines (sides) at portions other than corner regions, the load of the calculation processing is reduced. Accordingly, in an embodiment of the present invention, the circulating work-traveling along the outer perimeter is performed a plurality of times, and the work-unfinished region outer-shape map calculating section calculates, using a gravity center position of a trajectory point group corresponding to the own vehicle position data as a reference center, a plurality of side elements that are close to the reference center from among the trajectory point group, and calculates an outer-shape map of the work-unfinished region substantially in the shape of a polygon from the side elements.

In order to perform automatic work-traveling in the work-unfinished region, a target travel route suitable for the work-unfinished region is necessary. Accordingly, in an embodiment of the present invention, the work vehicle support system further includes a route calculating section configured to calculate a target travel route along which work-traveling is to be performed in the work-unfinished region, based on the outer-shape map calculated by the work-unfinished region outer-shape map calculating section.

A suitable route for automatic work-traveling in a work-unfinished region varies depending on a status of those targeted for work, for example, a growing state of grain culms in work for harvesting barley, wheat or rice or the like, even in the case of regions having similar shapes. Accordingly, in a preferred embodiment of the present invention, the route calculating section generates a plurality of the target travel routes, and outputs an optimal target travel route based on a predetermined travel condition. Accordingly, a target travel route optimally suited for set travel conditions (travel speed, work time, inclined or not inclined, etc.) is outputted, and thus the automatic work-traveling becomes more reasonable. In particular, if the economic efficiency of work is important, it is preferable that required travel times are respectively estimated and calculated for a plurality of the target travel routes, and the required travel times are used as the travel condition.

In deciding an automatic work-traveling route in a work-unfinished region, it is also important to use determination based on the experience of the operator. Accordingly, in a preferred embodiment of the present invention, the route calculating section generates a plurality of the target travel routes, and notice of the plurality of target travel routes is given for selection by an operator. Note that the required travel times are important as information that is used by an operator to make a decision. Accordingly, it is advantageous that required travel times are respectively estimated for the plurality of target travel routes, and notice of the required travel times is given in association with the plurality of target travel routes.

During automatic work-traveling along a target travel route, there may be a situation in which the work vehicle has to exit the target travel route for some reason. For example, if the work vehicle is out of fuel, or if the grain tank is full in case the work vehicle is a combine, the work vehicle has to approach a footpath such as a raised footpath to be supplied with fuel or to unload grains. Then, the work vehicle returns to the exit position of the target travel route and resumes the automatic work-traveling, but, if the exit position is far from the work vehicle, it is more efficient to start the automatic work-traveling on a target travel route that can be reached the soonest from the current position. Accordingly, in a preferred embodiment of the present invention, if the work vehicle exits the target travel route during work-traveling in the work-unfinished region along the target travel route, an outer-shape map of a new work-unfinished region is calculated from own vehicle position data acquired by the own vehicle position detecting module in the work-traveling up until at that time, and a target travel route along which work-traveling is to be performed in a remaining work-unfinished region is re-calculated based on the newly calculated outer-shape map and a current position of the work vehicle that has exited the target travel route.

A farm work vehicle such as a combine performs work such as harvesting in a region (cultivated land, etc.) in which work is to be performed by repeating reciprocating linear travel and direction-change travel (typically U-turns) therebetween. At that time, the work is performed in linear travel, and is not performed in direction-change travel. If the region in which work is to be performed is a quadrilateral with four right angles as in the case of a rectangular shape, in the direction-change travel trajectory, a travel trajectory from linear travel to direction-change travel and a travel trajectory from direction-change travel to linear travel are symmetric to each other. Accordingly, steering control can be easily performed. However, if the region in which work is to be performed is not a quadrilateral with four right angles as in the case of a trapezoid, in the direction-change travel trajectory, a travel trajectory from linear travel to direction-change travel and a travel trajectory from direction-change travel to linear travel are asymmetric to each other. Accordingly, the steering control becomes complex, and is likely to cause a positional deviation after the direction change. In order to avoid this problem, in a preferred embodiment of the present invention, the target travel route is calculated as a unit travel unit obtained by combining linear work-traveling and direction-change non-work-traveling, and the direction-change non-work-traveling is calculated as being divided into a simple U-turn travel in which a U-turn entering steering angle and a U-turn exiting steering angle match each other and an auxiliary linear non-work-traveling in which an endpoint of the simple U-turn travel and an endpoint of the linear work-traveling are connected. With this configuration, direction-change non-work-traveling is constituted by a simple U-turn travel in which travel trajectories are symmetric to each other and linear travel for adjustment, and thus the steering control becomes easy, and is not likely to cause a positional deviation after the direction change.

In automatic travel, an actual travel route may deviate from a target travel route due to some external disturbance factors or internal disturbance factors. In such a case, a better work result may be obtained by newly calculating a target travel route than by performing automatic control for returning to the currently used target travel route. Accordingly, in a preferred embodiment of the present invention, if a deviation of an actual travel route from the target travel route is more than a predetermined value, an outer-shape map of a new work-unfinished region is calculated from own vehicle position data acquired by the own vehicle position detecting module in the work-traveling up until at that time, and a target travel route along which work-traveling is to be performed in a remaining work-unfinished region is re-calculated based on the newly calculated outer-shape map.

When performing work through reciprocating linear work-traveling, in order to prevent any work from being left unfinished, overlapping of work trajectories in the reciprocating linear work-traveling is necessary. If the overlap significantly changes, it is difficult to correct the overlap with the currently used target travel route. Accordingly, it is preferable that, if an amount of overlap generated in an actual travel does not match a preset overlap amount by a predetermined amount or more, the target travel route is newly calculated.

BRIEF DESCRIPTION OF THE DRAWINGS

FIG. 1c is an enlarged view of detail A in FIG. 1a;

FIG. 2 is a side view of a combine, which is an example of the work vehicle, showing the work vehicle support system according to the present invention is mounted in;

EMBODIMENTS OF THE INVENTION

Figure 1A:
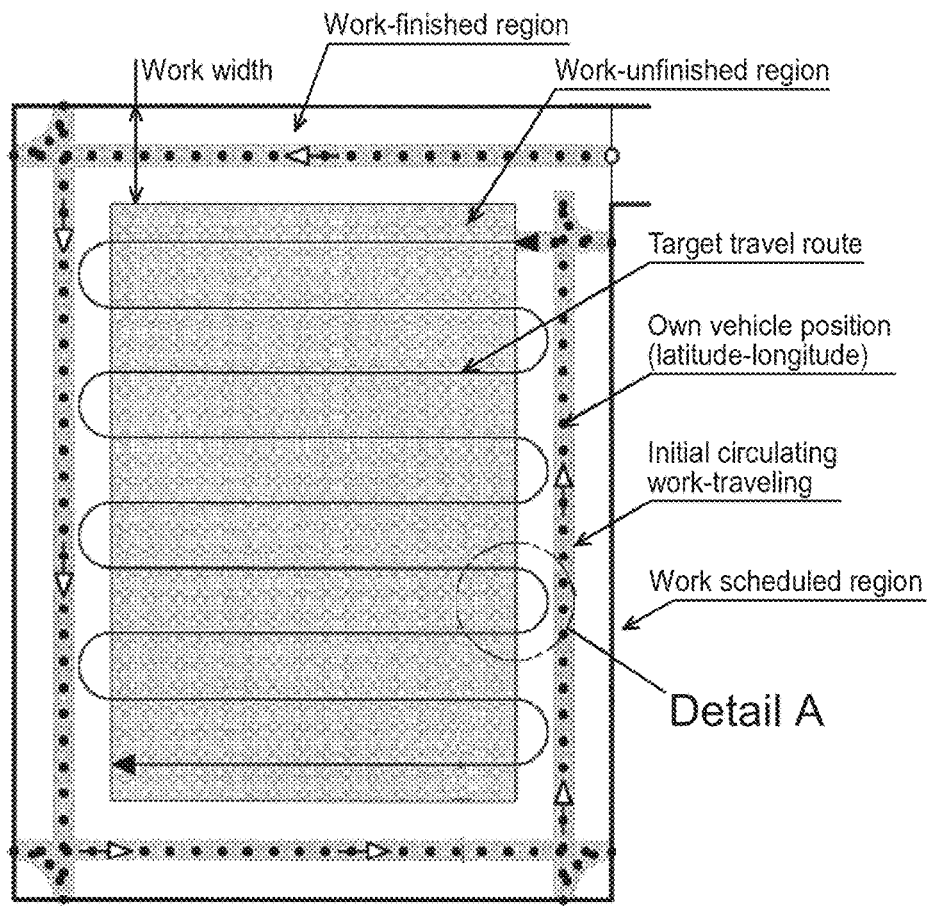
FIG. 1a is an explanatory view illustrating a basic principle of a work vehicle support system according to one example of the present invention.

Before illustrating specific embodiments of a work vehicle support system according to the present invention, a basic principle of a work vehicle support system, in particular, a basic principle for calculating an outer-shape map of a work scheduled region through teaching travel will be described with reference to FIG. 1a. In FIG. 1a, a work scheduled region in which work is to be performed by a work vehicle includes the work vehicle support system is shown in a simple rectangular shape. The work vehicle includes: a manual travel control unit configured to implement manual travel using a manual travel operating unit including a manipulation lever and the like; an automatic travel control unit configured to implement automatic travel based on automatic travel information; and an own vehicle position detecting module configured to detect an own vehicle position of the work vehicle. The manual travel operating unit is manually operated by an operator in the work vehicle. The automatic travel information contains travel device information and work device information. The travel device information contains steering control data and vehicle speed control data for performing automatic travel control on the work vehicle such that the own vehicle position detected by the own vehicle position detecting module is aligned with a target travel route. The work device information contains work control data for the work devices configured to perform work that has to be performed during travel along the target travel route.

As a work scheduled region, in this example, a piece of cultivated land is assumed whose outer perimeter is defined by a fence, ridges or the like. The work-traveling in the cultivated land, for example, work-traveling for harvesting ripe rice, barley, wheat or the like is divided into circular work-traveling performed first in a loop along the outer perimeter, and central work-traveling performed in a work-unfinished region that remains after the circular work-traveling. The circular work-traveling is divided into work-traveling performed along one side of the outer perimeter of a polygon (quadrangle in FIG. 1a), and direction-switching travel (where the direction is changed by performing reverse and forward motions: also referred to as "a turn") performed at a corner region of the polygon. The circular work-traveling is performed under manual travel control, and the central work-traveling is performed under automatic travel control.

Figure 1B:
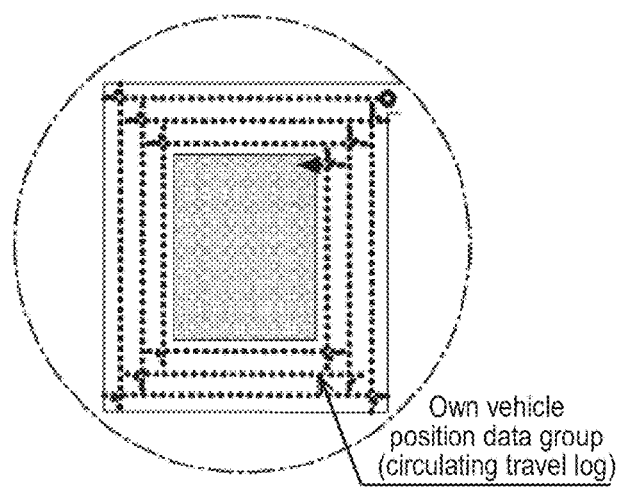
FIG. 1b is an explanatory view illustrating a basic principle of a work vehicle support system according to another example of the present invention.

An own vehicle position data group (e.g. circulating travel logs constituted by a latitude-longitude data group) indicating own vehicle positions detected over time by the own vehicle position detecting module during circular work-traveling through manual travel is recorded as a circular work-traveling trajectory. The recorded own vehicle position data group is virtually shown by black dots in FIG. 1a. Map data of a work-finished region in a work scheduled region, generated through circular work-traveling, can be calculated by adding a work width to this circular work-traveling trajectory. Furthermore, the region positioned inside the work-finished region (lightly hatched in FIG. 1a) is a work-unfinished region in which work has to be performed in the next instance of automatic work-traveling. An outer-shape map of the work-unfinished region can be calculated from the map data of the work-finished region. As shown in FIG. 1b, if the circular work-traveling is performed a plurality of times, a data group of own vehicle positions in circular work-traveling along the innermost perimeter is used to calculate an outer-shape map of the work-unfinished region. It will be appreciated that, at that time, data groups of own vehicle positions in circular travel other than the circular work-traveling along the innermost perimeter are also used to complement a loss or the like in the data group of own vehicle positions in the circular work-traveling along the innermost perimeter.

Hereinafter, an example of an algorithm to determine an outer-shape map of a work-unfinished region from a data group of own vehicle positions which are circulating travel logs will be described.

(1) From some of the own vehicle position data considered as noise are removed from the circulating travel logs which are a group of travel trajectory points, to extract only a data group that is determined to belong to the travel trajectory.

(2) A gravity center position of the extracted data group is calculated.

(3) A cardinal-direction of each point of the extracted data group relative to the gravity center is calculated using a reference point (typically, an end point of a circular work of the work vehicle) as an origin.

(4) Data for 360 degrees (one lap of the non-work region) about the gravity center position as the reference center is extracted as processing target data, from the calculated cardinal-directions of the respective points.
(5) The extracted processing target data is divided as side elements belonging to each side of the polygon (quadrangle in FIG. 1a).
(6) The divided side elements of each side are linearly approximated, an approximated linear equation indicating each side is calculated, and the coordinates of intersections of the lines are calculated.
(7) An outer-shape map of a work-unfinished region is calculated based on the reference point of the own vehicle position in the machine body and on the work width.

When the outer-shape map of the work-unfinished region is calculated, a target travel route for automatic work-traveling (central work-traveling) in the work-unfinished region is calculated. In the example in FIG. 1a, the target travel route includes reciprocating linear work-traveling in the work-unfinished region, and direction-switching travel in the work-finished region for connecting a forward path and a backward path of linear work-traveling. A target travel route can be calculated according to a start point of the target travel route (a start point of the central work-traveling), the direction of the linear work-traveling, intervals between a forward path and a backward path of adjacent linear work-traveling paths and the like. At that time, movement between routes connecting a forward path and a backward path is realized by combining forward motions and turns, and may be realized also by direction-switching travel including reverse motions. The time taken from the start to the end of movement between the routes varies depending on the movement distance or whether there is switching between forward and reverse motions. The movement time is short in a simple movement between routes such as a U-turn, but the area required for turning is large. On the other hand, the area required for movement is small in a direction-switching movement between routes, but the movement time is long. Basically, movement between routes where the movement time is as short as possible is used. However, various target routes can be calculated from the degree of freedom in combining various movements between the routes, the size of outer perimeter regions that are work-finished regions and the like. Accordingly, as methods for selecting a target travel route that is to be actually used from among a plurality of calculated target travel routes, the following modes are prepared.

Mode 1: A plurality of target travel routes are generated and displayed on a monitor screen or the like, and a target travel route along which travel is to be performed is decided through selection by an operator.

Mode 2: Required travel times if travel is performed along generated target travel routes are estimated as a travel condition, and a target travel route with the shortest time is automatically selected.

Mode 3: A plurality of target travel routes are displayed together with their respective required travel times, and a target travel route along which travel is to be performed is decided through selection by an operator.

Regarding calculation of a target travel route including linear travel and direction-change travel along the target travel route, the target travel route calculating algorithm varies depending on the type of change from linear travel to direction-change travel. In FIG. 1a, as direction-change travel, a direction-switching travel is used in a circular work-traveling through manual travel, and U-turn travel is used in central work-traveling. Which direction-change travel is to be used is preferably selected according to the position and the direction of linear travel to which connection of a path is to be established, but, as a calculation condition, the direction-change travel may be limited to either one of them, or the direction-change travels may be used in a mixed manner in one work region.

Figure 1C:
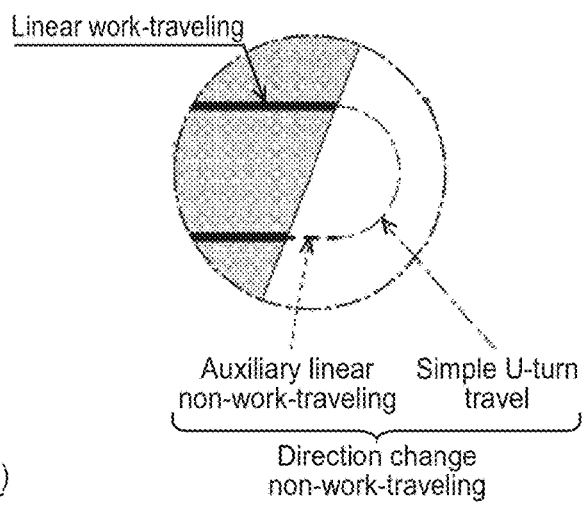

Although the region in which work is to be performed is shown in a rectangular shape in FIG. 1a, it is often the case that sides are slightly inclined as in the case of a trapezoid as shown in a partially enlarged view in FIG. 1c. In such cases, if a direction-change travel route in which an end point of a forward path and a start point of a backward path in linear work-traveling are connected directly via an arc route, the curvature of the U-shaped direction-change travel route continuously changes, and thus automatic travel control is difficult. In order to address these circumstances, as shown in the partially enlarged view in FIG. 1c, an algorithm is employed for dividing direction-change travel into a simple U-turn travel in which a U-turn entering steering angle and a U-turn exiting steering angle match each other, that is, a substantially semi-arc travel, and an auxiliary linear non-work-traveling in which an endpoint of the simple U-turn travel and an endpoint of the linear work-traveling are connected.

Figure 2:
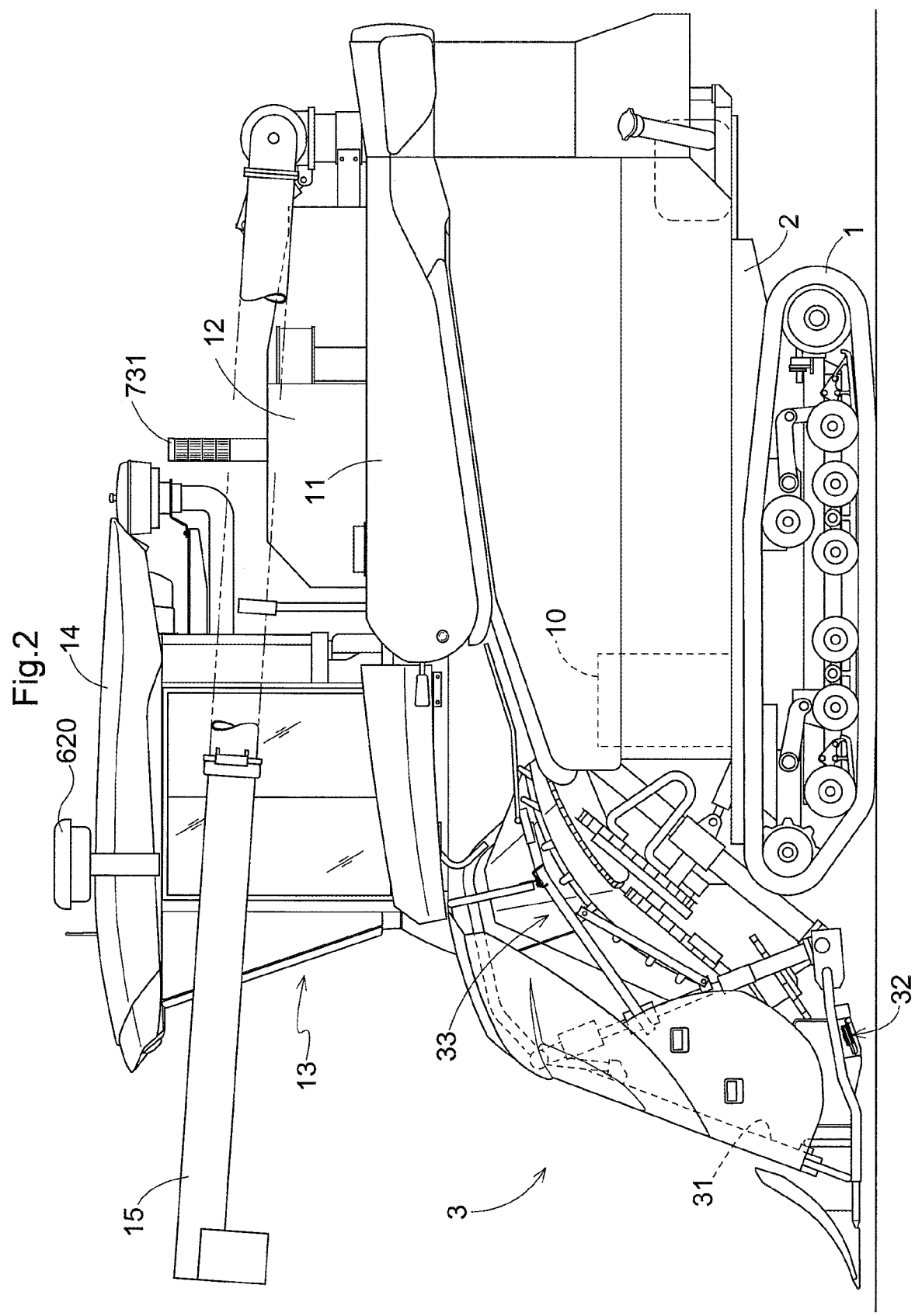
Figure 3:
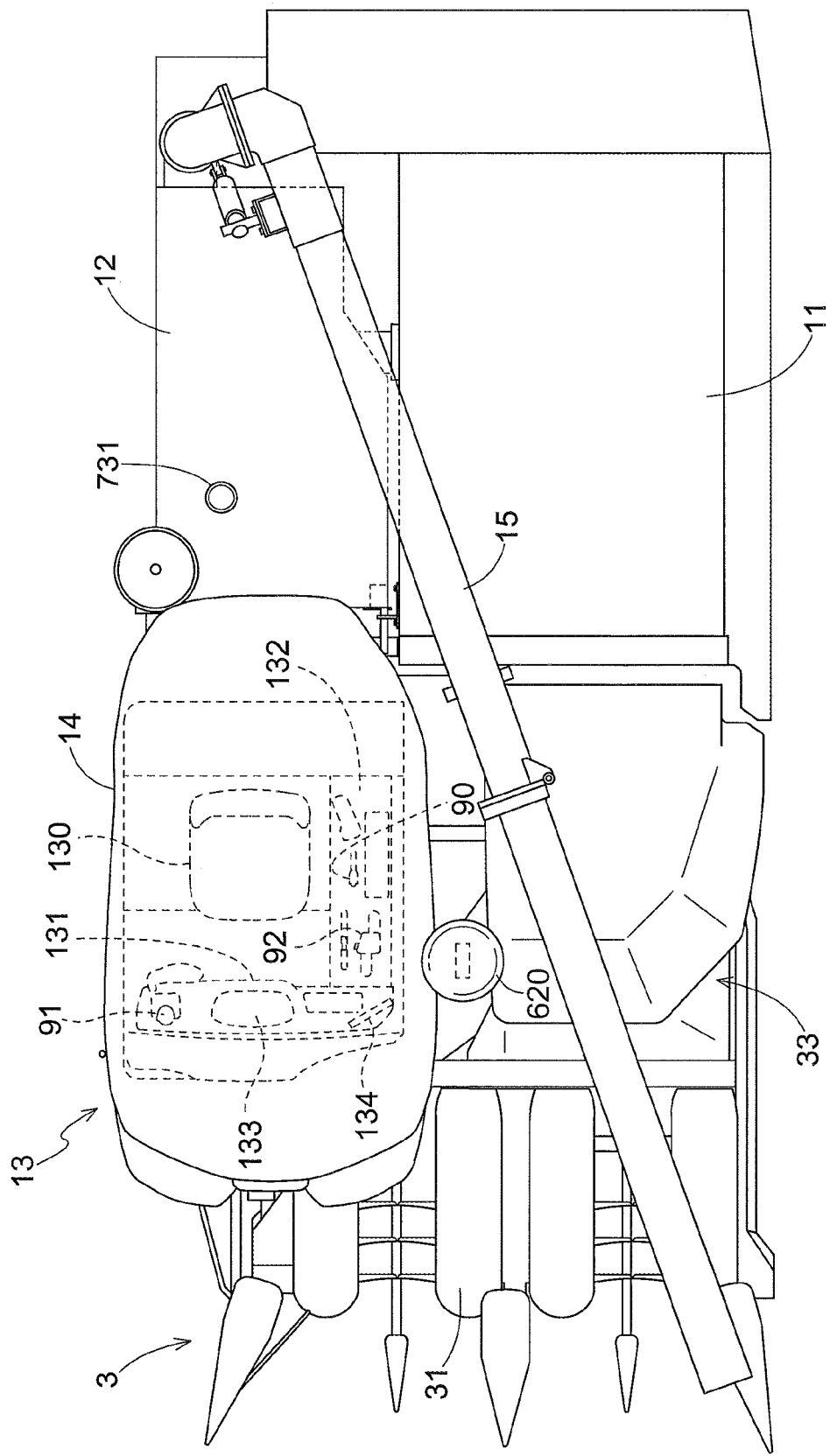
FIG. 3 is a plan view of the combine.

Next, a specific embodiment of the work vehicle support system according to the present invention will be described by way of an example in which the work vehicle support system is mounted in a combine, as an example of a work vehicle. FIG. 2 is a side view of the combine, and FIG. 3 is a plan view thereof. This combine is a culm-head feeding combine; and includes a crawler-type travel apparatus 1, and a machine body frame 2 supported by the travel apparatus 1. The front portion of the machine body frame 2 has a vertically movable cutting section 3 that cuts standing grain culms. In the rear portion of the machine body frame 2, a threshing apparatus 11 for threshing cut grain culms and a grain tank 12 for storing grain are arranged side by side in the right/left direction. A cabin 13 is provided in front of the grain tank 12, in the front portion of the machine body frame 2. The cabin 13 includes a ceiling panel 14. An engine 10 is arranged below the cabin 13. The grain tank 12 includes an unloader 15 for unloading grain in the grain tank 12.

The cutting section 3 can swing up/down about a swing axis that is horizontal in the right/left orientation. The cutting section 3 includes a raising apparatus 31 for raising standing grain culms, a cutting apparatus 32 for cutting raised grain culms, and a conveying apparatus 33 for conveying cut grain culms to the threshing apparatus 11.

Figure 4:
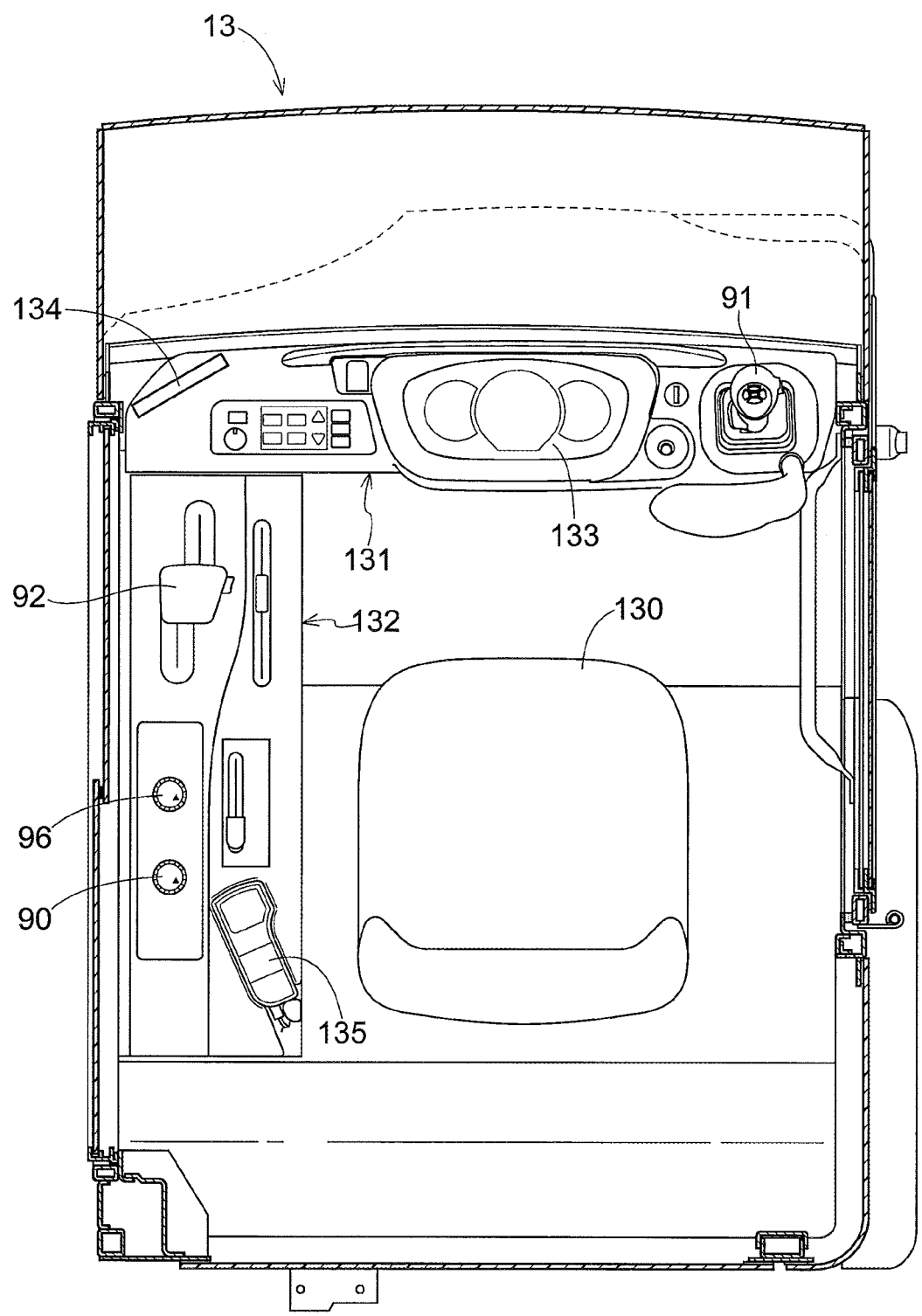
FIG. 4 is a plan view in section showing the inside of a cabin of the combine.

As shown in FIGS. 3 and 4, the cabin 13 includes a driver's seat 130. A front panel 131 is provided in front of the driver's seat 130, and a side panel 132 is provided on the left side of the driver's seat 130. On the front panel 131, for example, tools such as a manipulation lever (steering lever) 91 and a meter panel 133 for displaying various types of information are arranged. The meter panel 133 displays a meter screen indicating a working speed, an engine rotation, a fuel level and the like. Furthermore, a monitor 134 such as a liquid crystal panel for graphically displaying specific information is arranged, for example, in the upper left portion inside the cabin 13. The monitor 134 displays a selection screen of a target travel route used for automatic work-traveling and the like. On the side panel 132, for example, a main speed change lever 92 and other tools are arranged. On the side panel 132, a remote controller 135 for the unloader is arranged.

This combine can implement not only manual travel based on an operation by the manipulation lever 91 or the main speed change lever 92, but also automatic travel along a set target route. As a tool related to automatic travel, for example, an autopilot ON/OFF switch 90 for giving a command to perform or stop automatic travel and a teaching travel ON/OFF switch 96 are arranged on the side panel 132. These switches may be replaced with software switches displayed on the monitor 134, or may be provided in both hardware and software forms.

As shown in FIGS. 2 and 3, an own vehicle position detecting box 620 is arranged above the cabin 13 and attached to a bracket extending upward from a side end of the ceiling panel 14. An antenna, an arithmetic unit and the like used for detecting the own vehicle position are built into the own vehicle position detecting box 620. In this embodiment, the own vehicle position is detected using satellite navigation and inertial navigation.

Figure 5:
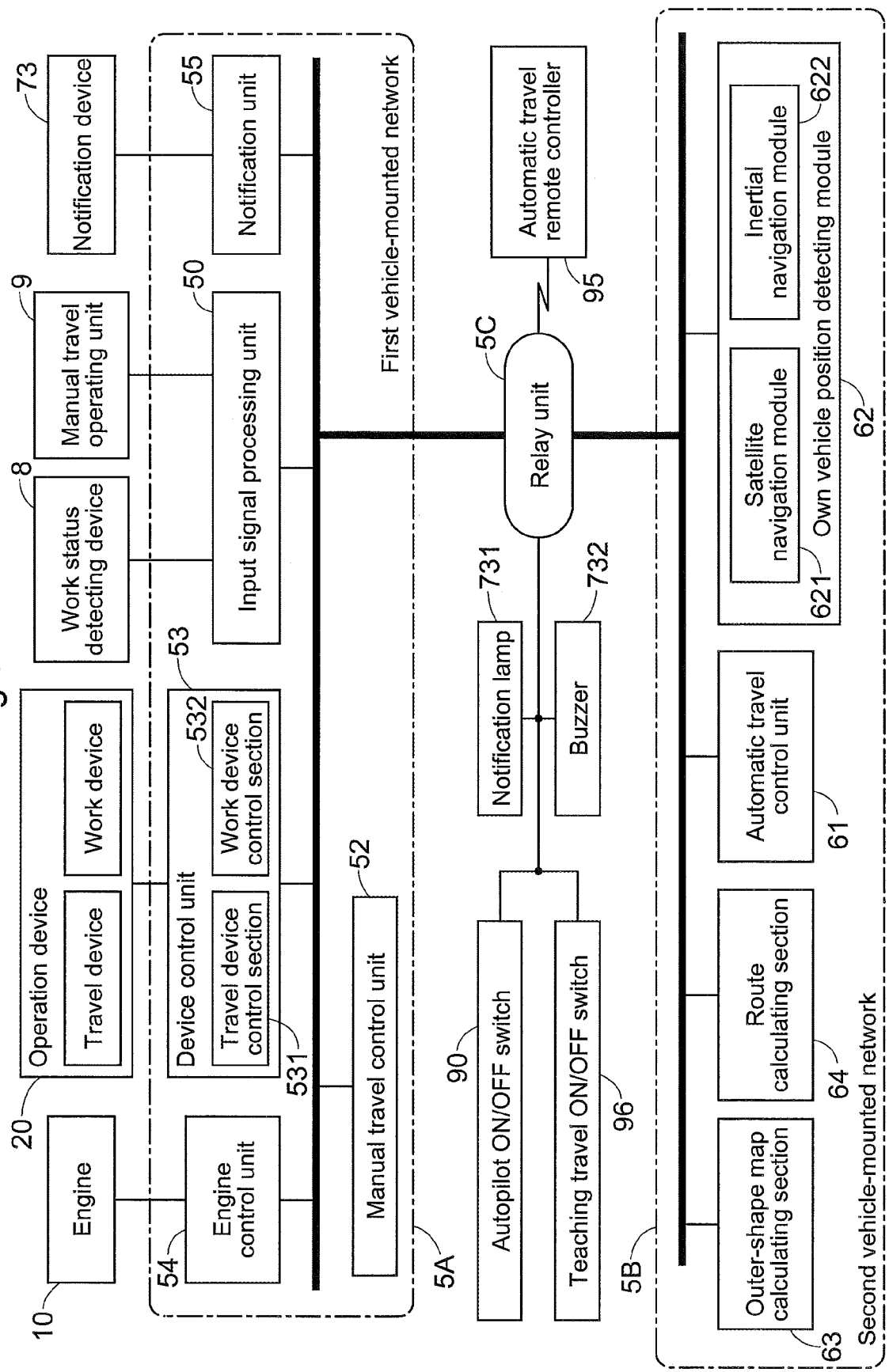
FIG. 5 is a functional block diagram illustrating a control system of the combine incorporating the work vehicle support system.

FIG. 5 shows a control system constructed in this combine. The control system includes a first vehicle-mounted network 5A and a second vehicle-mounted network 5B. The first vehicle-mounted network 5A and the second vehicle-mounted network 5B are bridged via a relay unit 5C. The first vehicle-mounted network 5A includes functional elements for performing basic operation control of the combine, such as an input signal processing unit 50, a manual travel control unit 52, a device control unit 53, an engine control unit 54 and a notification unit 55. The second vehicle-mounted network 5B includes functional elements related to automatic travel functioning as the work vehicle support system according to the present invention, such as an automatic travel control unit 61, an own vehicle position detecting module 62, an outer-shape map calculating section 63 and a route calculating section 64. This work vehicle support system uses the basic principle as described above with reference to FIG. 1a.

The device control unit 53 includes a travel device control section 531 that drives various operation devices for traveling (travel devices) by giving them a control signal; and a work device control section 532 that drives various operation devices for working (work devices) by giving them a control signal. The travel devices and the work devices are collectively referred to as an operation device 20 as shown in FIG. 5. The engine control unit 54 gives a control signal to the engine 10 for starting or stopping the engine 10 or for adjusting the rotational speed thereof, for example. The manual travel operating unit 9 as shown in FIG. 5 is a collective term for tools operated by a person in work-traveling of the combine; and includes the manipulation lever 91, the main speed change lever 92 and the like. Essentially, this combine employs a by-wire method. An operation made to the manual travel operating unit 9 is inputted as an operation signal to the input signal processing unit 50. A work status detecting device 8 detects status information regarding the operation device 20, that is, work device information; and includes various sensors and switches (e.g. a switch for detecting ON and OFF of a clutch of various work mechanisms, or a vehicle speed sensor) and the like provided in the combine. A detection signal from the work status detecting device 8 is also essentially inputted to the input signal processing unit 50.

The notification unit 55 transmits a notification signal to a notification device 73, thereby notifying it of various types of information that is to be given to an operator and surrounding people. The notification device 73 includes not only the monitor 134, but also various lamps inside or outside the machine body (e.g. a notification lamp 731 shown in FIGS. 2 and 3) and a buzzer 732.

The manual travel control unit 52 performs arithmetic processing or determination processing, using a signal input through the input signal processing unit 50 or work device information from the work status detecting device 8, thereby generating data for controlling an operation of the operation device 20 based on a manual operation. The generated data is transmitted to the device control unit 53, and is converted and output from the device control unit 53 to the operation device 20 as a control signal. Accordingly, an operation of the operation device 20 corresponding to the manual operation is realized. For example, driving for changing the direction of the travel apparatus 1 is performed based on a direction change output signal, and the machine body traveling direction is changed.

The own vehicle position detecting module 62 includes a satellite navigation module 621 for detecting a cardinal-direction such as latitude and longitude using a GNSS (Global Navigation Satellite System) (which may be a GPS (Global Positioning System)); and has a configuration similar to that of a positioning unit used in car navigation systems and the like. The own vehicle position detecting module 62 in this embodiment includes an inertial navigation module 622 incorporating a gyroscope acceleration sensor and a magnetic cardinal-direction sensor for detecting a momentary movement (direction vector, etc.) of the work vehicle and an orientation, for assisting the satellite navigation module 621.

The outer-shape map calculating section 63 calculates the outer-shape map of cultivated land in which automatic work-traveling is to be performed. When the teaching travel ON/OFF switch 96 is turned ON, and if circulating work-traveling through manual travel is performed along an outer perimeter of a piece of cultivated land, where rice, barley or wheat is grown, to start the teaching mode for calculating an outer-shape map, then the outer-shape map calculating section 63 calculates an outer-shape map of a work-unfinished region in which automatic work-traveling is to be performed, from own vehicle position data acquired at that time by the own vehicle position detecting module 62. When the outer-shape map is calculated, the route calculating section 64 calculates a target travel route along which work-traveling is to be performed in a work-unfinished region, based on the outer-shape map. If a plurality of target travel routes are calculated, illustration images schematically showing the target travel routes are displayed on the screen of the monitor 134 together with their estimated travel times, and an operator is prompted to select one of them.

The automatic travel control unit 61 implements automatic travel, based on automatic travel information necessary for automatic travel. The automatic travel information contains a mismatch (deviation) between the own vehicle position based on the own vehicle position data and the target travel route, a mismatch between a travel direction of the own vehicle and a direction obtained by extending the target travel route, a vehicle speed set in advance, an operation of the working machine that needs to be performed during travel along the target travel route, machine body status information from the work status detecting device 8 and the like. The automatic travel control unit 61 gives the necessary control data to the device control unit 53 based on the automatic travel information, thereby controlling the travel devices and the work devices mounted in the combine.

In this embodiment, the relay unit 5C performs data exchange between the first vehicle-mounted network 5A and the second vehicle-mounted network 5B, and, furthermore, the relay unit 5C itself includes an input/output interface for an external device and a data processing section. Accordingly, the notification lamp 731 and the buzzer 732 functioning as the notification device 73, the autopilot ON/OFF switch 90, and the teaching travel ON/OFF switch 96 are connected to the relay unit 5C, and an automatic travel remote controller 95 is wirelessly connected to the relay unit 5C.

As shown in FIGS. 2 and 3, the notification lamp 731 is a cylindrical lamp provided upright on the upper face of the grain tank 12, and may turn ON during automatic travel, thereby notifying surrounding people of that the combine is in automatic travel. In a similar manner, the buzzer 732 can notify surrounding people of that the combine is in teaching work-traveling or automatic travel. When the combine is in automatic travel, the minimal commands have to be provided with from outside the combine toward the combine, and thus the automatic travel remote controller 95 is provided. The automatic travel remote controller 95 is includes, for example, an emergency stop button, an engine start button and an automatic drive button; and commands to stop the combine in an emergency, to start the engine and to perform automatic driving can be given to the control system of the combine from the outside.

Figure 6:
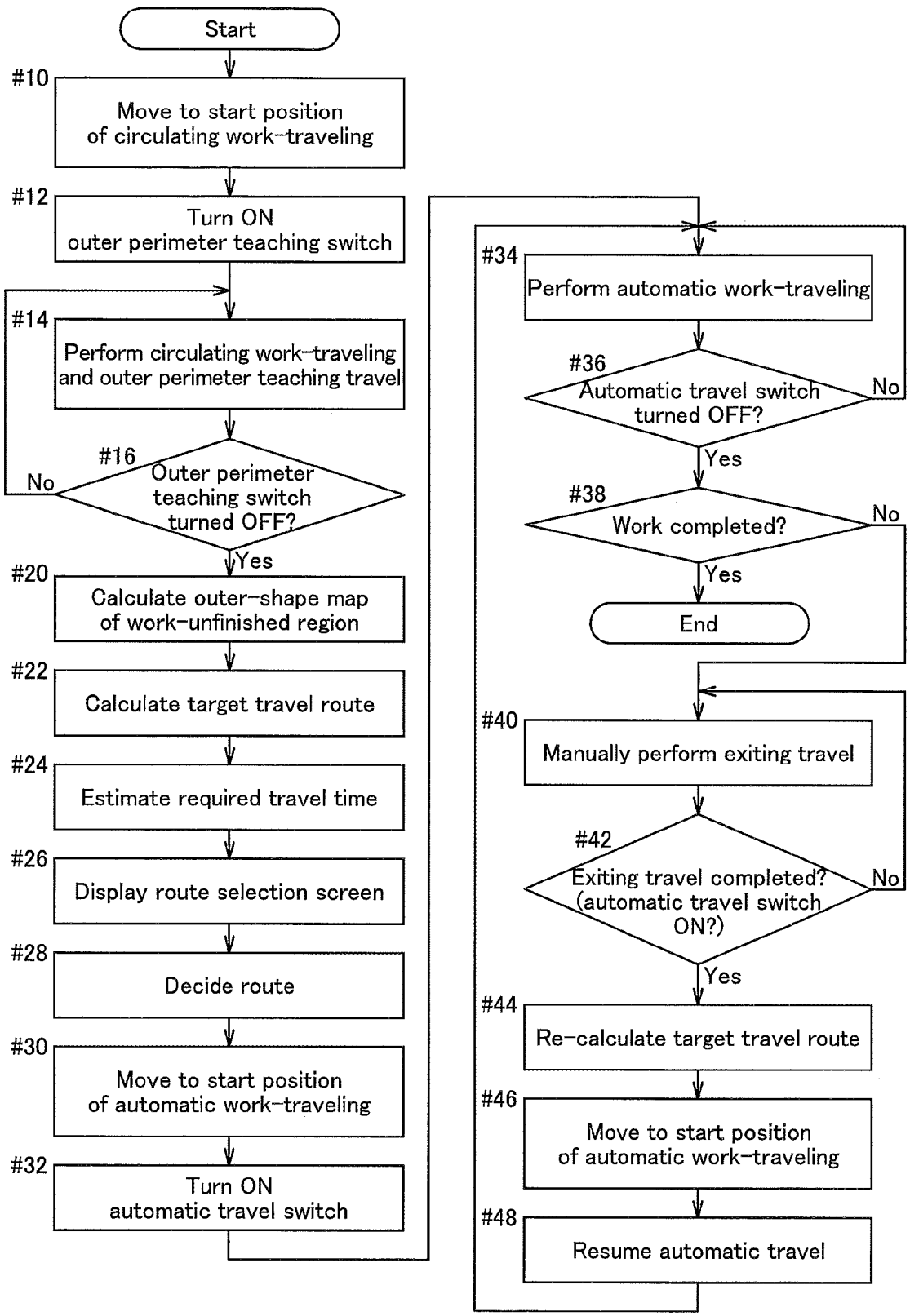
FIG. 6 is a flowchart showing an example of work-traveling control by the work vehicle support system.

Next, an example in which the combine performs cutting harvesting work while performing automatic travel in a piece of cultivated land will be described with reference to the flowchart in FIG. 6. First, an operator moves the combine through manual driving to a start position from which circulating work-traveling is to be started (#10). The teaching travel ON/OFF switch 96 is turned ON (#12), and circulating work-traveling and outer perimeter teaching travel as headland work are simultaneously performed (#14). When the headland is secured sufficiently, the circulating work-traveling is ended, and the teaching travel ON/OFF switch 96 is turned OFF to stop the outer perimeter teaching. When the teaching travel ON/OFF switch 96 is turned OFF (branching to Yes from #16), an outer-shape map of the work-unfinished region in the cultivated land other than the headland is calculated using the own vehicle position data group acquired in the outer perimeter teaching travel up until at that time (#20).

The cutting harvesting work in the work-unfinished region is performed through automatic work-traveling, and thus one or more target travel routes in the work-unfinished region are calculated (#22). Travel speeds are set for the calculated target travel routes, and required travel times are estimated (#24). An illustration image of each target travel route and the corresponding estimated travel time are displayed on the monitor 134 so that the operator can select one of them if there are a plurality of calculated target travel routes, or so that the operator can confirm the target travel route if there is only one target travel route calculated (#26). When a target travel route for automatic work-traveling is decided (#28), the combine is moved to the start position of the automatic work-traveling (#30). When combine reaches the start position of the automatic work-traveling, the autopilot ON/OFF switch 90 is turned ON (#32), and the automatic work-traveling is started (#34).

The automatic work-traveling can be stopped using an operation made to the manipulation lever 91 or the like as a trigger as described above in order to avoid an emergency, but normally, the automatic work-traveling is ended by turning OFF the autopilot ON/OFF switch 90. In this flowchart, however, change control from automatic travel to manual travel in order to avoid an emergency is omitted. During the automatic work-traveling, it is checked whether or not a command to stop the automatic travel has been given by turning OFF the autopilot ON/OFF switch 90 (#36). If it is seen that the autopilot ON/OFF switch 90 has been turned OFF, it is further checked whether or not work-traveling has been completed on all target travel routes allocated to the work-unfinished region (#38). If the work-traveling has not been completed (branching to No from #38), it is considered that the combine has exited the route during the work, and the control changes to manual travel control. In this example, the exiting travel is an exiting travel in which, in the case of a combine, the machine body is moved to a conveying vehicle waiting at a ridge for unloading of the grain tank 12 that has been full, and the exiting travel is one of commonly performed travels (#40). Completion of the exiting travel is confirmed by turning ON the autopilot ON/OFF switch 90 again (#42).

If the combine exits the target travel route or a mismatch (deviation) of an actual travel route from the target travel route is more than a predetermined value, an outer-shape map of a new work-unfinished region is calculated by the outer-shape map calculating section 63 based on the own vehicle position data acquired by the own vehicle position detecting module 62 in the work-traveling up until at that time. Then, a target travel route along which work-traveling is to be performed in a remaining work-unfinished region is re-calculated by the route calculating section 64 based on the newly calculated outer-shape map.

For example, if the autopilot ON/OFF switch 90 is turned ON after the combine exits the target travel route, that is, if the exiting travel is completed (branching to Yes from #42), an outer-shape map of the work-unfinished region remaining at the time of exit is calculated by the outer-shape map calculating section 63, based on the own vehicle position data acquired by the own vehicle position detecting module 62 in the work-traveling up until at that time. Then, a target travel route including a resume position of the automatic work-traveling is re-calculated, based on the own vehicle position of the combine at that time and the outer-shape map of the work-unfinished region remaining at the time of exit (#44). The combine can be moved to the resume position of the automatic work-traveling through automatic travel control, but also can be moved thereto through manual travel control (#46). In whichever cases, when the combine reaches the resume position of the automatic work-traveling in the new target travel route, automatic work-traveling along the target travel route as performed previously is resumed (#48).

If it is found in the check at step #38 that the work-traveling has been completed on all target travel routes, the work in the work scheduled region has been completed, and thus the cutting harvesting work is ended.

It should be noted that, when performing work through reciprocating linear work-traveling in order to prevent any work from being left unfinished, overlapping of work trajectories in the reciprocating linear work-traveling is necessary. In this embodiment, if the amount of overlap generated in an actual travel does not match a preset overlap amount by a predetermined amount or more, the target travel route is newly calculated by the route calculating section 64.

Other Embodiments (1) In the foregoing embodiment, if a deviation of an actual travel trajectory of a work vehicle from a target travel route is more than a predetermined value or if the overlap amount does not match a preset overlap amount by a predetermined amount or more, the target travel route is newly calculated, but the target travel route may be recalculated at any time based on a determination made by the operator.

(2) In the foregoing embodiment, the control system of the combine includes the first vehicle-mounted network 5A and the second vehicle-mounted network 5B bridged via the relay unit 5C, but it may include three or more vehicle-mounted networks, or may be constituted by a single vehicle-mounted network. If the first vehicle-mounted network 5A is a vehicle-mounted network for a conventional manual travel vehicle, it is advantageous to add an automatic travel function to the conventional manual travel vehicle because the vehicle-mounted network of the conventional manual travel vehicle can be used substantially as it is, by constructing an automatic travel-related functional block in the second vehicle-mounted network 5B bridged via the relay unit 5C.

(3) In the foregoing embodiment, manual travel is realized through an operation made to the manual travel operating unit 9 by an operator in the combine. However, a signal from the automatic travel remote controller 95 may be inputted to the input signal processing unit 50, and manual travel may be realized through an operation made on the automatic travel remote controller 95 by an operator who is outside the combine. In this case, it is preferable to use a smartphone or a tablet device instead of the monitor 134 such that an operation made on the monitor 134 or the like is performed by an operator who is outside the combine.

(4) In the foregoing embodiment, as a target travel route for automatic work-traveling (central work-traveling) after an outer-shape map is calculated, a route connecting reciprocating linear work-traveling via 180-degree U-turn travel is used as shown in FIG. 1a. Hereinafter, example of other target travel routes will be described.

Figure 7:
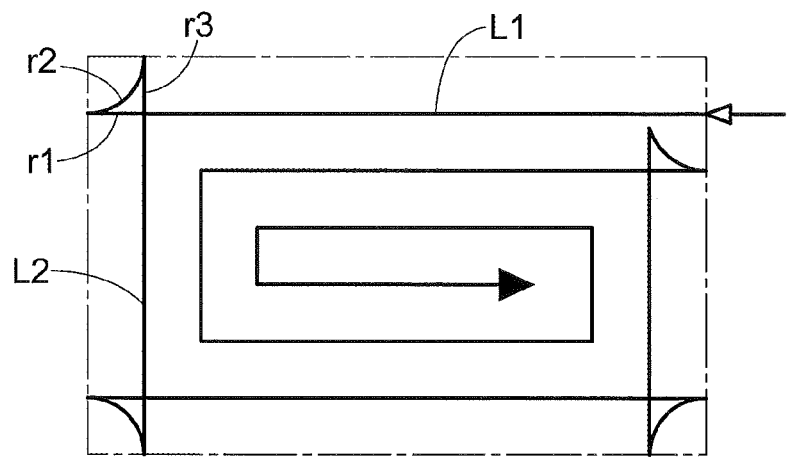
FIG. 7 is a travel route diagram showing an example of a target travel route for central work-traveling.

(a) A target travel route shown in FIG. 7 is a route along which the vehicle spirally travels so as to form quadrangles from the outer side toward the center, and each 90-degree corner connecting linear routes is a direction-switching travel route where reverse motions are also included. Such a direction-switching travel route will be described. The direction-switching travel route includes: a first route r1 along which the vehicle travels forward from an entering-side linear route L1 before entering a direction-switching travel route, substantially in a linear form or while spiraling (in a linear form in FIG. 7); a second route r2 along which the vehicle travels in reverse at a steering angle in the opposite direction; and a third route r3 along which the vehicle travels forward from the direction-switching travel route to a next exiting-side linear route L2. The second route r2 preferably extends to a position from which the third route r3 can extend substantially in a linear form. FIG. 7 shows only four direction-switching travel in the outer perimeter, but the direction-switching travel may be performed at all 90-degree corners.

Figure 8:
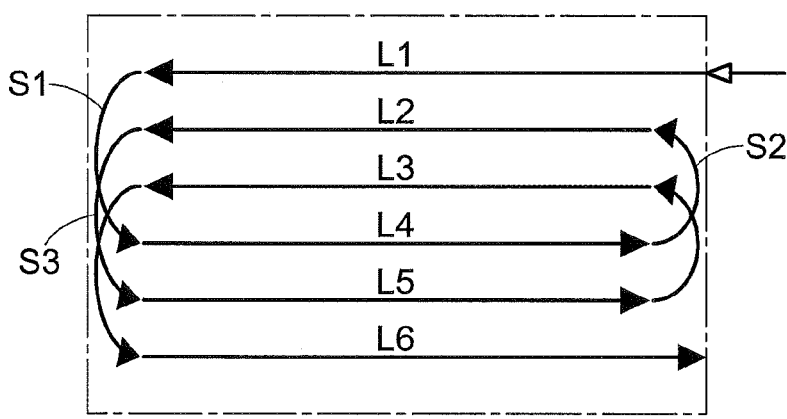
FIG. 8 is a travel route diagram showing an example of a target travel route for central work-traveling.

(b) A target travel route shown in FIG. 8 is a route obtained by connecting every two linear routes of parallel routes L1 to L6 via 180-degree U-turn routes. At that time, each 180-degree U-turn route extends over one or more linear routes. That is to say, one or more linear routes are arranged between two linear routes connected via a U-turn route. In the target travel route, the linear route L1 is connected to the linear route L4 via a 180-degree U-turn route S1 in which the two linear routes L2 and L3 are arranged. Next, the linear route L4 is connected to the linear route L2 via a 180-degree U-turn route S2 in which the linear route L3 is arranged. Furthermore, the linear route L2 is connected to the linear route L5 via a 180-degree U-turn route S3 in which the two linear routes L3 and L4 are arranged. In this manner, each 180-degree U-turn route is connected to the next linear route over one or more linear routes, and thus the radius of curvature becomes large and turning can be easily made, as a result of which the vehicle can travel at high speed.

Figure 9:
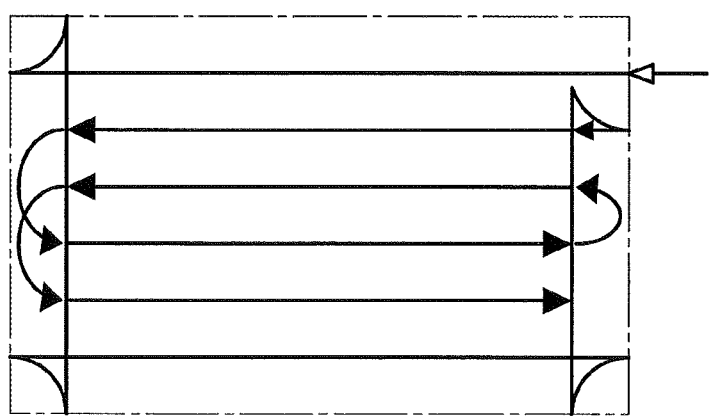
FIG. 9 is a travel route diagram showing an example of a target travel route for central work-traveling.

(c) A target travel route a shown in FIG. 9 is a route obtained by combining the target travel route in FIG. 7 and the target travel route in FIG. 8. That is to say, the direction-switching travel route as shown in FIG. 7 is used as a travel route on the outer side, and the travel route as shown in FIG. 8 is used as a travel route on the inner side, that is, this travel route is a travel route using a 180-degree U-turn route extending over one or more linear routes.

INDUSTRIAL APPLICABILITY

The present invention can be applied to a culm-head feeding combine, an ordinary combine (whole-culm charging combine), and other work vehicles such as a rice planting machine and a tractor.

DESCRIPTION OF REFERENCE SIGNS

20 Operation device
31 Raising apparatus
32 Cutting apparatus
33 Conveying apparatus
5A First vehicle-mounted network
5B Second vehicle-mounted network
5C Relay unit
50 Input signal processing unit
52 Manual travel control unit
53 Device control unit
531 Travel device control section
532 Work device control section
54 Engine control unit
55 Notification unit
61 Automatic travel control unit
62 Own vehicle position detecting module
620 Own vehicle position detecting box
621 Satellite navigation module
622 Inertial navigation module
63 Outer-shape map calculating section
64 Route calculating section
73 Notification device
731 Notification lamp
8 Work status detecting device
9 Manual travel operating unit
90 Autopilot ON/OFF switch
91 Manipulation lever
92 Main speed change lever
95 Automatic travel remote controller
96 Teaching travel ON/OFF switch

What is claimed is:
1. A work vehicle support system comprising:
an own vehicle position detecting module configured to detect an own vehicle position of a work vehicle;
a work-unfinished region outer-shape map calculating section configured to calculate, during circulating work-traveling along an outer perimeter of a work scheduled region, an outer-shape map of a work-unfinished region in the work scheduled region, from own vehicle position data acquired by the own vehicle position detecting module; and
a route calculating section configured to calculate a target travel route along which work-traveling is to be per- formed in the work-unfinished region based on the outer-shape map calculated by the work-unfinished region outer-shape map calculating section;

wherein, when the work vehicle keeps performing work-traveling in the work-unfinished region along the target travel route and when a deviation of an actual travel route from the target travel route exceeds a predetermined value, an outer-shape map of a new work-unfinished region is calculated from own vehicle position data acquired by the own vehicle position detecting module in the work-traveling up until a time when the deviation exceeds the predetermined value, and a target travel route along which work-traveling is to be performed in a remaining work-unfinished region is re-calculated based on the newly calculated outer-shape map.

2. The work vehicle support system according to claim 1, wherein the work vehicle is a combine, and the circulating work-traveling along the outer perimeter is circular reaping travel for harvesting grain culms.

3. The work vehicle support system according to claim 1, wherein the circulating work-traveling along the outer perimeter is performed a plurality of times, and the work-unfinished region outer-shape map calculating section assumes a gravity center position of a trajectory point group corresponding to the own vehicle position data as a reference center, calculates a plurality of side elements that are close to the reference center from among the trajectory point group, and calculates an outer-shape map of the work-unfinished region in the shape of a polygon from the side elements.

4. The work vehicle support system according to claim 1, wherein the route calculating section generates a plurality of the target travel routes, and notice of the plurality of target travel routes is given for selection by an operator.

5. The work vehicle support system according to claim 1, wherein required travel times are respectively estimated for the plurality of target travel routes, and notice of the required travel times is given in association with the plurality of target travel routes.

6. The work vehicle support system according to claim 1, wherein, when the work vehicle exits the target travel route during work-traveling in the work-unfinished region along the target travel route and thereafter returns to a position of the target travel route where the work vehicle exits for resuming the work-traveling, an outer-shape map of a new work-unfinished region is calculated from own vehicle position data acquired by the own vehicle position detecting module in the work-traveling up until a time when the work vehicle exits the target travel route, and a target travel route along which work-traveling is to be performed in a remaining work-unfinished region is re-calculated based on the newly calculated outer-shape map and a current position of the work vehicle that has exited the target travel route.

7. The work vehicle support system according to claim 1, wherein the target travel route is calculated as a unit travel unit obtained by combining linear work-traveling and direction-change non-work-traveling, and the direction-change non-work-traveling is calculated as being divided into a simple U-turn travel in which a U-turn entering steering angle and a U-turn exiting steering angle match each other and an auxiliary linear non-work-traveling in which an endpoint of the simple U-turn travel and an endpoint of the linear work-traveling are connected.

8. The work vehicle support system according to claim 1, wherein the route calculating section generates a plurality of the target travel routes, and outputs an optimal target travel route based on a predetermined travel condition.

9. The work vehicle support system according to claim 8, wherein required travel times are respectively estimated for the plurality of target travel routes, and the required travel times are used as the travel condition.

10. A work vehicle support system comprising:

an own vehicle position detecting module configured to detect an own vehicle position of a work vehicle;

a work-unfinished region outer-shape map calculating section configured to calculate, during circulating work-traveling along an outer perimeter of a work scheduled region, an outer-shape map of a work-unfinished region in the work scheduled region, from own vehicle position data acquired by the own vehicle position detecting module; and a route calculating section configured to calculate a target travel route along which work-traveling is to be performed in the work-unfinished region based on the outer-shape map calculated by the work-unfinished region outer-shape map calculating section, wherein, when the work vehicle keeps performing work-traveling in the work-unfinished region along the target travel route, and wherein, when an amount of overlap generated in an actual travel does not match a preset overlap amount by a predetermined amount or more, the target travel route is newly calculated.

\* \* \* \* \*